US011381992B2

United States Patent
Cooper et al.

(10) Patent No.: US 11,381,992 B2
(45) Date of Patent: *Jul. 5, 2022

(54) DATA PACKAGE SELECTION FOR DATA REPORTING OF ONE OR MORE DATA SOURCES

(71) Applicant: Skylo Technologies, Inc., Palo Alto, CA (US)

(72) Inventors: Jennifer Cooper, Mountain View, CA (US); Andrew Nuttall, Mountain View, CA (US); Meghna Agrawal, Cupertino, CA (US)

(73) Assignee: Skylo Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,938

(22) Filed: Apr. 1, 2021

(65) Prior Publication Data

US 2021/0227415 A1 Jul. 22, 2021

Related U.S. Application Data

(63) Continuation of application No. 16/658,043, filed on Oct. 19, 2019, now Pat. No. 10,999,755.

(51) Int. Cl.
*H04W 24/10* (2009.01)
*H04W 72/04* (2009.01)
*G06Q 30/00* (2012.01)

(52) U.S. Cl.
CPC .......... *H04W 24/10* (2013.01); *G06Q 30/016* (2013.01); *H04W 72/04* (2013.01)

(58) Field of Classification Search
CPC .... H04W 24/10; H04W 72/04; G06Q 30/016; H04L 67/03
See application file for complete search history.

(56) References Cited

U.S. PATENT DOCUMENTS

| | | |
|---|---|---|
| 6,591,084 B1 | 7/2003 | Chuprun et al. |
| 9,455,777 B1 | 9/2016 | Johnson et al. |
| 9,622,259 B2 | 4/2017 | Johnson et al. |
| 2005/0129058 A1 | 6/2005 | Casaccia et al. |
| 2014/0181288 A1 | 6/2014 | Potkonjak |
| 2014/0370914 A1 | 12/2014 | Jung et al. |
| 2016/0125471 A1 | 5/2016 | Hsu et al. |

*Primary Examiner* — Dinh Nguyen
(74) *Attorney, Agent, or Firm* — Brian R. Short (57) ABSTRACT

Apparatuses, methods, and systems for data source reporting are disclosed. A method includes receiving, by a network provider, data types a customer user is to have reported from one or more data sources of the customer user, wherein the reporting is from data sources, and wherein the wireless reporting is through a wireless uplink between the data sources to a base station, providing, by the network provider, options of data packages to the customer, wherein the options of data packages are selected from the set of data packages based on the data types provided by the customer user, and receiving, by the network provider, from the customer user, a selection of a data package from the provided options of data packages, wherein the selected data package includes one or more data types, and when data within the selected data package are to be reported.

20 Claims, 9 Drawing Sheets

Receiving, by a network provider, data types a customer user is to have reported from one or more data sources of the customer user, wherein the reporting is from one or more data sources, and wherein the wireless reporting is through a wireless uplink between the one or more data sources to a base station
610

Providing, by the network provider, options of data packages to the customer, wherein the options of data packages are selected from the set of data packages sizes based on the data types provided by the customer user
620

Receiving, by the network provider, from the customer user, a selection of a data package from the provided options of data packages, wherein the selected data package includes one or more data types, and how and when data within the selected data package are to be reported through the wireless uplink
630

DATA PACKAGE SELECTION FOR DATA REPORTING OF ONE OR MORE DATA SOURCES

RELATED APPLICATIONS

This patent application is a continuation of U.S. patent application Ser. No. 16/658,043, filed Oct. 19, 2019, which is herein incorporated by reference.

FIELD OF THE DESCRIBED EMBODIMENTS

The described embodiments relate generally to wireless communications. More particularly, the described embodiments relate to systems, methods and apparatuses for selecting a data package for data reporting of one or more data sources.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such a GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for selecting a data package for data reporting of one or more data sources.

SUMMARY

An embodiment includes a method of data source reporting. The method including providing, by a network provider, options of data packages to a customer user, wherein the options of data packages are selected from a set of data packages based on the data types the customer user is to have reported from one or more data sources used by the customer user, and receiving, by the network provider, from the customer user, a selection of a data package from the provided options of data packages, wherein the selected data package includes one or more data types, and when data of the selected data package are to be reported through a wireless uplink between the one or more data sources to a base station.

Another embodiment includes a wireless system. The system includes a plurality of data sources, the plurality of data sources connected through a wireless link to a base station, and a network server network connected to the base station. The network server is operative to provide options of data packages to a customer user, wherein the options of data packages are selected from a set of data packages based on the data types the customer user is to have reported from one or more data sources used by the customer user, and receive from the customer user, a selection of a data package from the provided options of data packages, wherein the selected data package includes one or more data types, and when data of the selected data package are to be reported through a wireless uplink between the one or more data sources to a base station.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for reporting data of data sources of a customer user. For an embodiment, a network provider receives data types a customer user is to have reported from one or more data sources of the customer user. The network provider provides options of data packages to the customer, wherein the options are selected from a set of data packages based on the data types provided by the customer user. The network provider receives from the customer user a selection of one or more data packages from the provided options of data packages, wherein the selected one or more data packages include one or more data types, and how and when data within the selected one or more data packages are to be reported through the wireless uplink.

Figure 1:
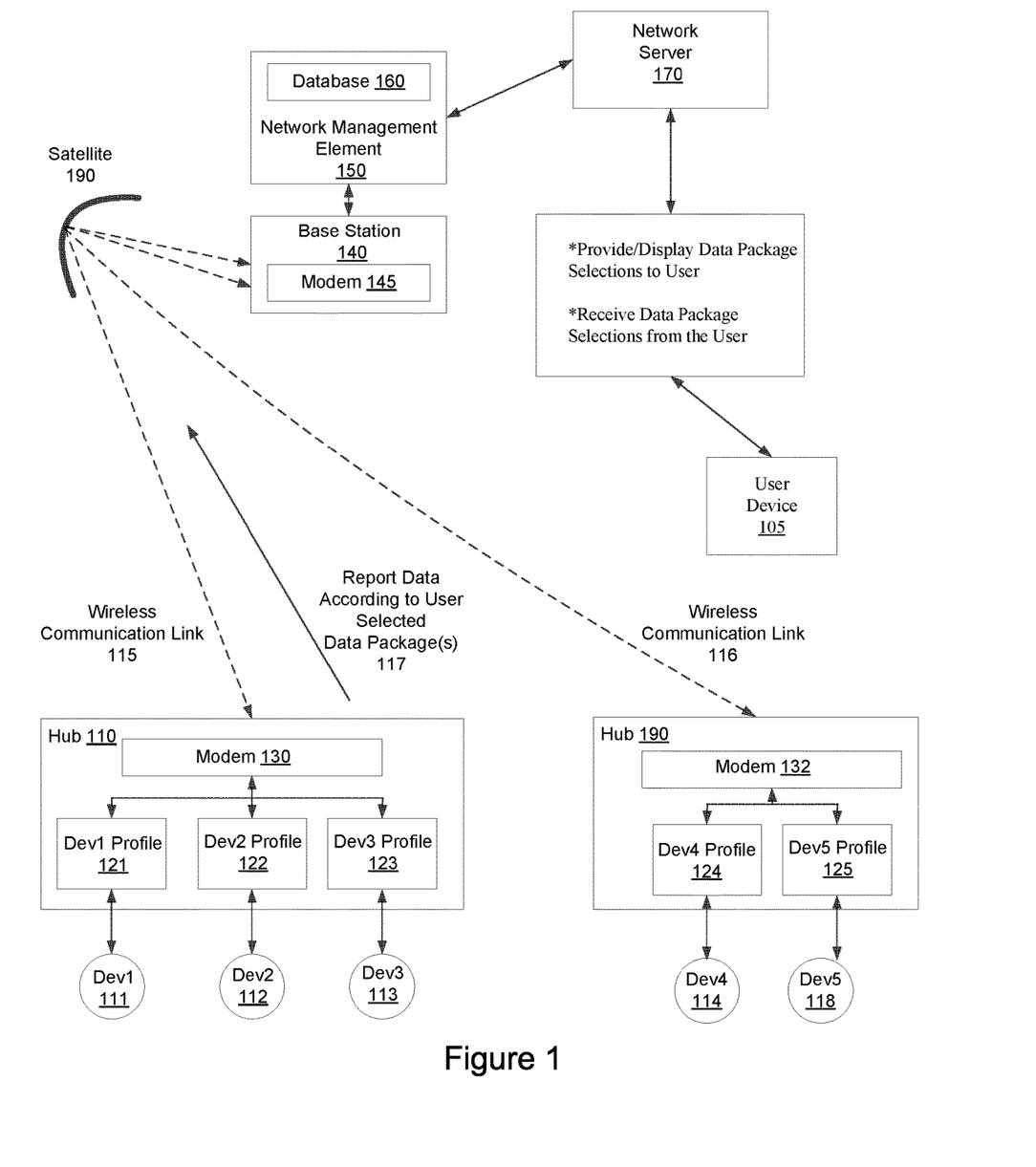
FIG. 1 shows a plurality of hubs that communicate data of data sources through a satellite link to a base station, according to an embodiment.

FIG. 1 shows a plurality of hubs 110, 190 that communicate data of data sources through a satellite link to a base station 140, according to an embodiment. For an embodiment, a network server 170 operates to generate scheduling of the wireless communication between the base station 140 and the plurality of hubs 110, 190 through wireless links 115, 116. For an embodiment, the network server 170 may access a database 160 of, for example, a network management element 150, aid in generating the schedule communication, and provide the scheduled communication to the base station 140. For an embodiment, the scheduled communication includes allocating frequency and time slots for both uplink and downlink wireless communication. For an embodiment, the base station 140 includes a modem 145 and the hubs 110, 190 include modems 130, 132, for enabling the wireless communication between the base station 140 and the hubs 110, 190.

For an embodiment, the network server 170 bases the scheduling of the wireless communication between the base station 140 and the plurality of hubs 110, 190 on one or more data packages selected by a customer user from the provided options of data packages. That is, the network server 170 provides options of data packages to the customer user. The network server 170 then receives a data package selection from the customer user (through for example a user device 105). The options of data packages provided to the customer user can be adaptively updated based on conditions and performance of data reporting and the network.

For at least some embodiments, the selected data package includes one or more data types, and how and when data within the selected data package are to be reported through the wireless uplink. For an embodiment, the data of data sources are reported by the hubs according to a hub profile. For an embodiment, the hub profile includes a data package profile(s). For an embodiment, the data package profile(s) are based on the data package(s) selected by the customer user.

For an embodiment, the hub profile includes a superset of information that contains multiple sub profiles including, the mentioned data package profile. For an embodiment, the hub profile includes the set of operating procedures that determine how data is collected, processed, and transmitted over the network.

For an embodiment, the data package profile includes a definition of how data is organized within an over-the-air network packet. The data package profile may include, for example, information like the first 4 bytes of this packet are temperature information. For an embodiment, the data package profile also includes trigger functions into this definition. That is, for at least some embodiments, the data package profile determines what (what data) is reported, and how/when the data is reported.

For an embodiment, the network server 170 generates the hub profile (121, 122, 123, 124, 125) for each of the hubs 110, 190. For example, the server 170 generates the hub profile that the base station 140 provides to the hub 190. Further, for an embodiment, the network server 170 generates a data package profile. For an embodiment, the data package profile (which as described can be included within the hub profile) includes a periodicity, an offset (timing delay), and a carrier frequency based on the scheduled communication. For an embodiment, the hub utilizes the periodicity, the offset, and the carrier frequency of its hub profile for determining when and at what carrier frequency to transmit uplink wireless communication to the base station 140. As previously stated, the data package selected by the customer user determines the reporting of data from the data sources of the customer through the wireless uplink. Accordingly, for an embodiment, the data packages selected compose the data package profiles of the hubs. For an embodiment, the hub profiles and the data package profile can be utilized on a hub to hub basis, or they can be defined and managed for many hubs (thousands+) at once.

For an embodiment, the data package selections are received by the network server 170 from the customer user from a user device 105 through a first network (for example, cellular) and the reporting of the data by the hubs 110, 190 is through a second network that includes the base station 140.

For an embodiment, the base station 140 then receives a data package uplink wireless communication from each of the plurality of hubs 110, 190 according to the hub profile and data package profile of each of the hubs 110, 190 and according to the scheduled communication. For an embodiment, the hubs 110, 190 use the data package profiles for determining when to transmit, and the base station 140 uses the scheduled communication to determine when to receive the uplink wireless communication. That is, the data is reported 117 according to the user selected data package(s).

For an embodiment, the data sources are integrated with the hub 110, 190, and as described, the data generated by these data sources is reported according to the hub profile and the data package profile. For an embodiment, the data source (such as data sources 111, 112, 113, 114, 118) are external data sources that are connected to the hubs 110, 190, and the hubs report the data received from the external data sources 111, 112, 113, 114, 118 according to the hub profile and the data package profile. For an embodiment, the hubs 110, 190 include both internal (integrated with the hub) and external data sources.

As shown, for an embodiment, the uplink wireless communication is transmitted by plurality of hubs and received by the base station through a satellite wireless link via a satellite 191.

Figure 2:
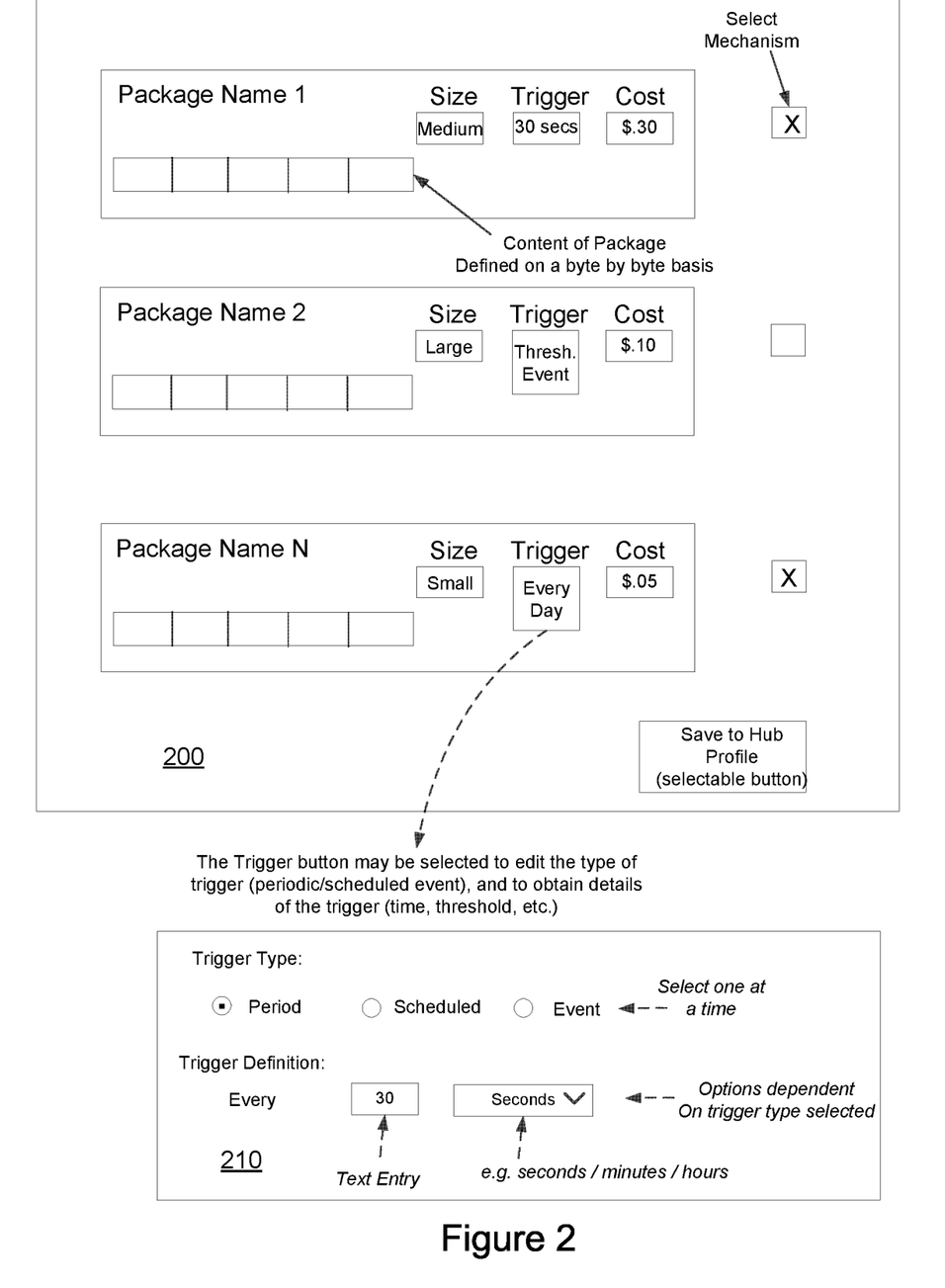
FIG. 2 shows a display of selections provided to a customer to allow the customer to select a data package from the provided options of data packages, according to an embodiment.

FIG. 2 shows a display 200 of selections provided to a customer to allow the customer to select a data package from the provided options of data packages, according to an embodiment. For an embodiment, the display 200 is on, for example, the user device 150 of the customer user.

For at least some embodiments, different data package options are provided to the customer user, wherein the different data package options include different pricing options $A, $B, $C. As shown, the display 200 may include different data package options (Package Name 1, Package Name 2, Package Name N) which may include size, trigger, and/or cost.

Further, for at least some embodiments, the different data packages include different possible reporting trigger selections, which are accessed, for example, through a dropdown menu 210. That is, one or more trigger functions can be selected to drive the reporting of data from a hub and data source. For example, the customer user may select from periodic reporting, a trigger function (that includes, for example a Boolean function), state change triggering, and/or scheduled reporting.

For at least some embodiments, the selected data package includes an identifier, and a template, wherein the template specifies where different data types are located within the package. Precisely specifying where different types of data are located within the data package provide for efficiency in that the base station knows exactly where the data is located. The hubs fill the selected data package with data as defined by the template, and the base station retrieves the data from the data package as defined by the template. For at least some embodiments, the template is used by the base station (or other upstream device) to decode received uplink data packages and extract the data (for example, for presentation to the user) from the data packages.

As previously stated, for at least some embodiments, the selected data package further includes a trigger function that specifies how and when data within the selected data package is reported through the wireless uplink. For an embodiment, the trigger function includes one or more of periodic reporting, state change detection reporting, or scheduled reporting of the collected data. Again, the template includes the trigger functions. The trigger function can be communicated to the hubs through the data package profiles.

For at least some embodiments, the trigger functions are weighted. As described, different data packages will have different trigger functions. For at least some embodiments, the different trigger functions have different weights. That is, the satisfaction (transmission) of one package takes priority over another data package depending on the trigger functions of the packages. For an embodiment, the customer user can select a weighting of the trigger functions used to report the data from the data sources through the hubs. For example, the customer user can select period reporting and state change detection reporting, wherein one reporting type takes priority over the other. That is, for an embodiment, the data package profiles include trigger function priority information.

For an embodiment, the customer user can select whether the selected data package profile requires an explicit reception acknowledgment from the base station, which if not received triggers additional transmissions of the data package by the hub. This option can be selected for data with high reliability requirements.

At least some embodiments include queueing the data packages based on the trigger functions. For an embodiment, the priority information affects which local queue on the hub the data package is placed in. For an embodiment, the hubs include multiple priority-based queues which are serviced by the modem (in the hub) in priority descending order. For an embodiment, data package profiles which include an explicit acknowledgment requirement (as selectable by the customer user) from the base station the data package remains in the queue after transmission until the acknowledgement is received by the hub.

For an embodiment, trigger functions can be activated by direct user input as selected by the user in defining the data package profiles.

For an embodiment, a trigger function can be activated via a mechanical button, a software button, or other user activated inputs to transmit for example an SOS data package corresponding with an SOS data package profile For at least some embodiments, the priorities of the trigger functions are adaptively updated over at least one of time, location, geography, and/or proximity to another device, person, or object. That is, for an embodiment, the trigger functions also contain a timing selection. For example, a trigger function may specify that a data package must be sent within 1 hr of creation of the data package. An adaptive priority could specify a temporal priority (such as, a higher priority at night). An adaptive priority could specify a geographical priority (geo-mapping boundaries for high priority areas—useful for the military, near hostile area). Further, an adaptive priority could specify moving geo-mapping boundaries, such a proximity to an object, place, or person, such as a drone. The adaptive characteristics of the priorities of the trigger function can be selected by the user customer at the time the user customer is making data package selections. Further, the adaptive updating of the trigger function can be customer user selected. That is, the customer user may select trigger functions of the data reporting to be adaptively weighted based on time, a location of the data source, and/or the proximity of the data source to a device, object, or person.

Figure 3:
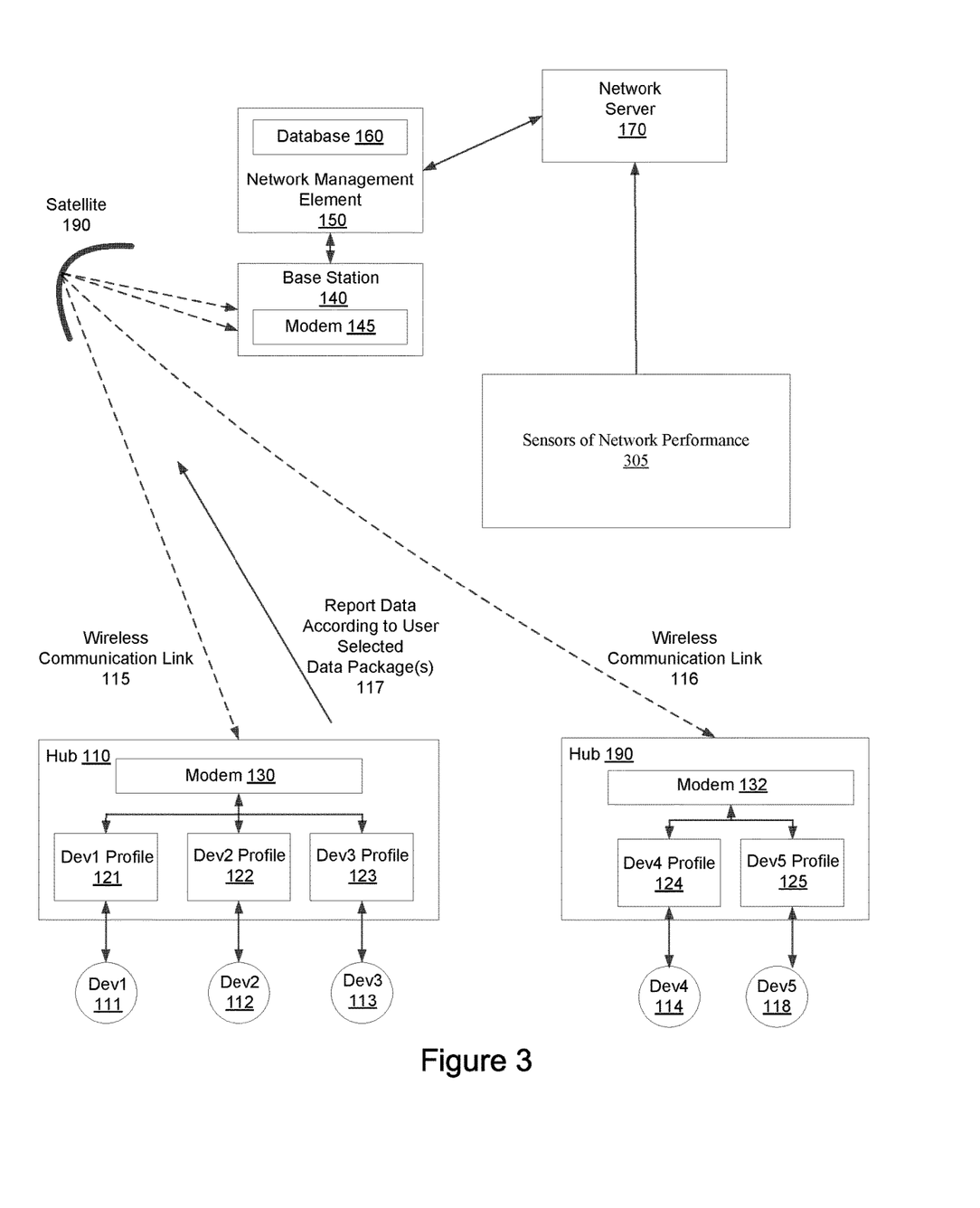
FIG. 3 shows a network server and the determination of analytics of network reporting of data of data packages, according to an embodiment.

FIG. 3 shows a network server and the determination of analytics of network reporting of data of data packages, according to an embodiment. For at least some embodiments, data is collected at various locations within the network for monitoring performance of the reporting of data. For an embodiment, the data packages offered to the customer user are adaptively updated based on the analytics that are generated based on at least the collected data. For an embodiment, the network is monitored by analytics that report of the performance of the network. The result of the reports is then used to drive the package suggestion to the user, in order to optimize or improve the network efficiency. For an embodiment, data is collected (for example by the base station) on the performance of the network. For an embodiment, analytics are then run on this data to report of the performance levels. The performance may include, for example utilizing 'quiet' hours to send data depending upon trigger functions. Examples of collected data include Data Connection Set Up Success Rate, Data Delivery Rate, Data Delivery Latency, Network Attach Success Rate % of Active hubs, Total Number of Channels operational, Network Utilization—are they under or over utilized, No of Channels utilized >80% —Above 80% is a very busy channel, so will need balancing if this goes on long term, Network Uptime, Network Congestion (Blocking). FIG. 3 shows sensors of the network performance 305. However, network performance analytics may or may not use actual sensors of the network performance. The network performance can be collected by any means available.

Figure 4:
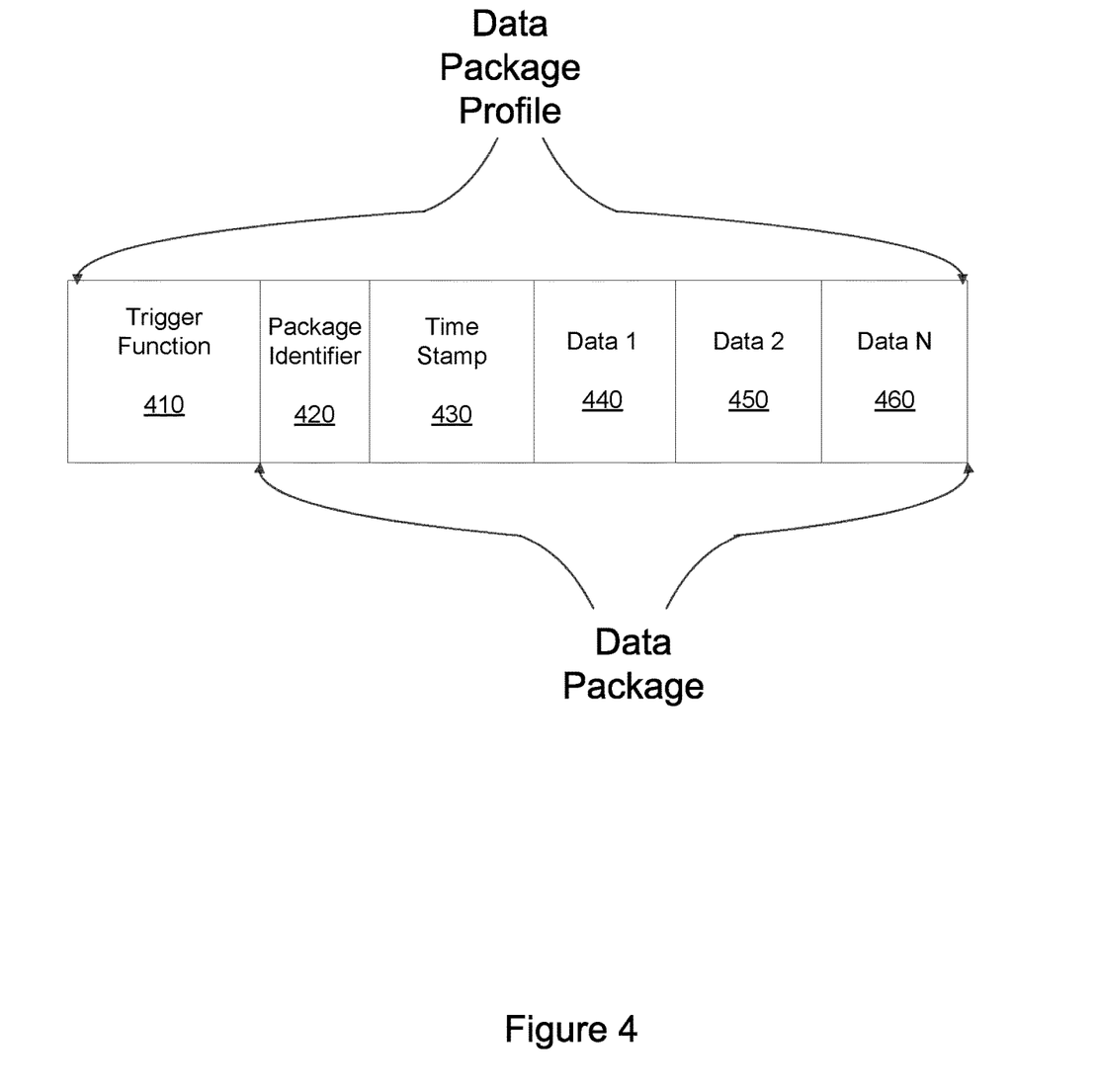
FIG. 4 shows an example of a selected data package, according to an embodiment.

FIG. 4 shows an example of a selected data package profile, which includes the details of what data should be included in the selected data package according to an embodiment. For an embodiment, the data package profile includes, a trigger functions 410, a package identifier 420, a timestamp 430 and data (data 1 440, data2 450, data N 460). The data package includes the package identifier 420, one or more timestamps 430, and the data (data 1 440, data2 450, data N 460).

For an embodiment, the package identifier 420 is used by an upstream device (such as, the base station) to determine the formatting of the data package, which allows the upstream device to extract, translate, and consume the data from the data package, and identify the transmitting hub of the data package.

As previously stated, the selected data package provides a template of where different types of data (data 1 440, data2 450, data N 460) are located within the reported data package. For an embodiment, the package identifier functions as the template. Further, for an embodiment, one or more time stamps 430 that are correlated with the data, is contained within the data package.

Figure 5:
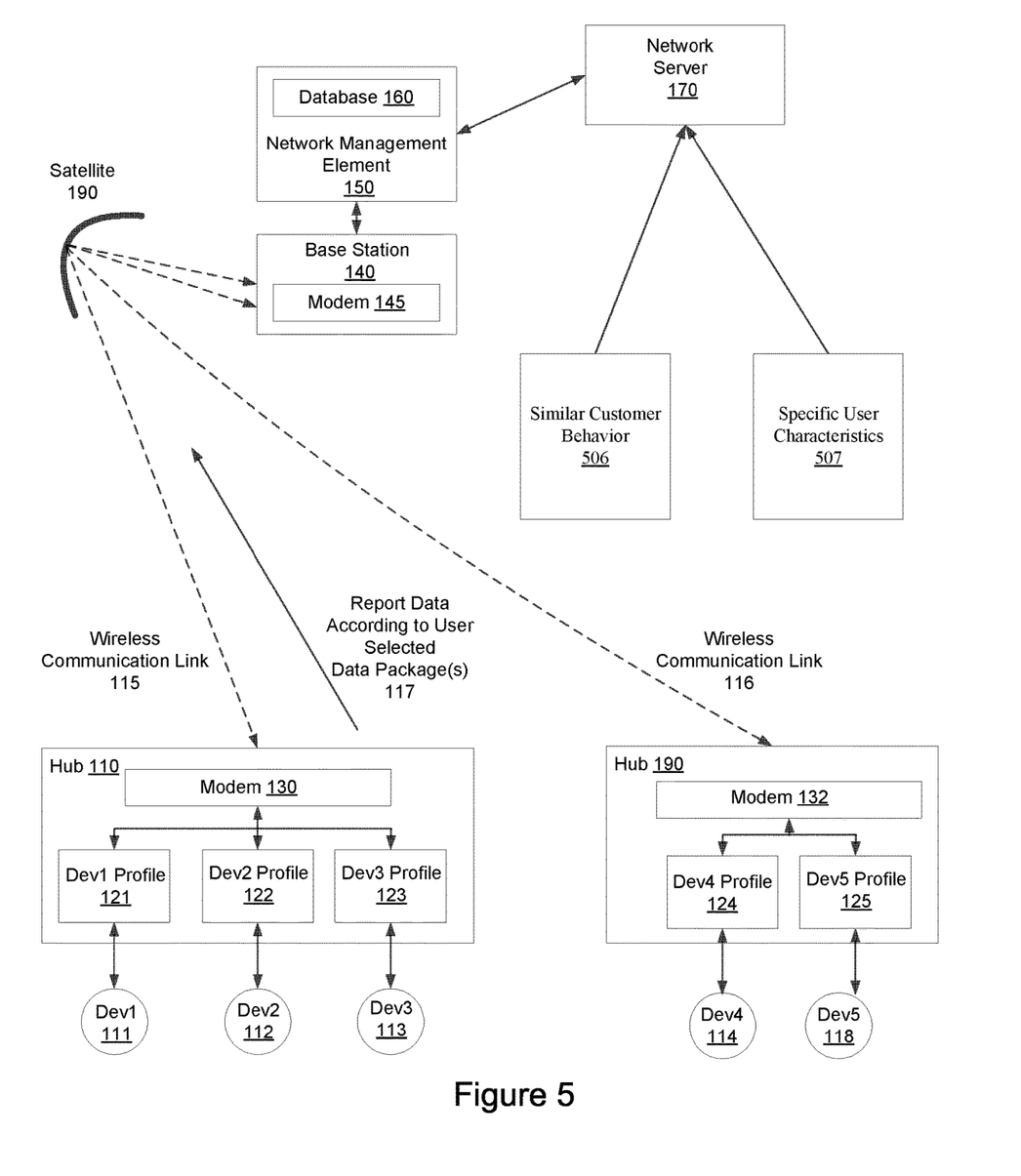
FIG. 5 shows a network server and data bases that include similar customer behavior and specific characteristics of the user, according to an embodiment.

FIG. 5 shows a network server 170 and databases that include similar customer behavior and specific characteristics of the user, according to an embodiment. For an embodiment, a similar customer behavior database 506 is available to the network server 170. The similar customer behavior database 506 includes data reporting characteristics and behaviors of similar types of customers which can be used by the network server 170 in providing options of data packages to the customer. That is, for an embodiment, the network server 170 provides options of the data packages to the customer, wherein the options of data packages are based on behavior of similar types of customers (industry standards).

For an embodiment, data types (and/or data type selections) received by other customer users are used to identify other customer users that are similar to the present customer user. Further, once similar other customers have been identified, the network server operates to identify the preferences of the similar other customers, and the network server operates to identify what was successful for the similar other customers. For an embodiment, the network server operates to gather statistical information about what other packages have been created and provided value for other customers, and uses that information to provide suggestions of data packages to the user.

For an embodiment, a specific customer behavior database 507 is available to the network server 170. For an embodiment, the network server 170 provides options of the data packages to the customer are additionally based on specific characteristics of the user. For an embodiment, the specific characteristics include, for example, the data type, the industry of a business of the customer user, the number of hubs used by the customer user, the location of hubs, the use cases for the hubs (what type of assets, and how are those assets (for example trucks used for long distance, or refrigeration, or big hauling) used).

Figure 6:
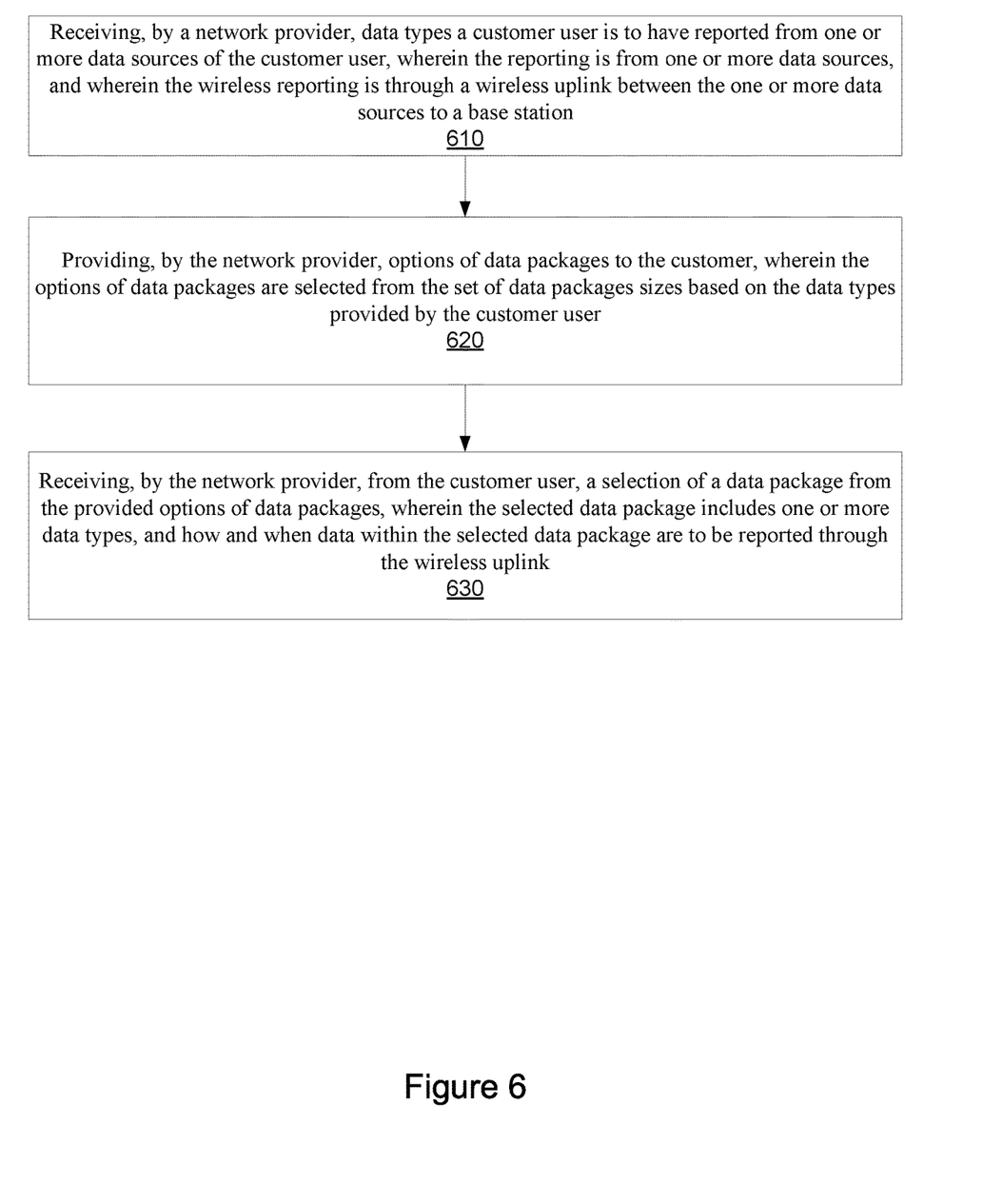
FIG. 6 is a flow chart that includes steps of a method of selecting a data package for data reporting of one or more data sources, according to an embodiment.

FIG. 6 is a flow chart that includes steps of a method of selecting a data package for data reporting of one or more data sources, according to an embodiment. A first step 610 includes receiving, by a network provider, data types a customer user is to have reported from one or more data sources of the customer user, wherein the reporting is from one or more data sources, and wherein the wireless reporting is through a wireless uplink between the one or more data sources to a base station. A second step 620 includes providing, by the network provider, options of data packages to the customer, wherein the options of data packages are selected from the set of data packages based on the data types used by the customer user. As described, for at least some embodiments, the options are generated based upon the customer user selected sensors connected to the hub, the specific types of data selected, the profile of the customer user and the field of service or industry, the current and past network operating conditions, and regulatory requirements (for an embodiment data package profiles are provided to the customer for ease of use to satisfy regulatory requirements. A third step 630 includes receiving, by the network provider, from the customer user, a selection of one or more data packages from the provided options of data packages, wherein the selected one or more data package includes one or more data types, and how and when data of the selected data package are to be reported through the wireless uplink. For at least some embodiments, the transmission of data packages is scheduled, coordinated, prioritized, and controlled by a network server to reduce overhead, eliminate collisions, and increase communication channel density via the descriptors provided in a data package profile(s) of the selected data package(s).

As previously described, an embodiment includes reporting data from the data sources of the customer through the wireless uplink according to the selected data package. A previously described, triggering of the data reporting is included within a data package profile. For an embodiment, the data package profile is included within the hub profile. For an embodiment, the hub profile is propagated to the hubs, and provides information to the hub to allow the hub to report data in data package as specified by a customer user.

At least some embodiments further include collecting, by the network provider, statistics of reporting of data of data packages, and adaptively updating the options of the data packages provided to the customer based on the collected statistics. For a least some embodiments, the options of data packages provided to the customer are additionally selected from the set of data packages sizes to improve data traffic between the one or more data sources and the base station.

For an embodiment, the selected data package includes an identifier, and a template, wherein the template specifies where different data types are located within the package.

For at least some embodiments, the selected data package further includes a trigger function that specifies how and when data within the selected data package is reported through the wireless uplink. For at least some embodiments, the trigger function includes one or more of periodic reporting, state change detection reporting, or scheduled reporting of the collected data. For at least some embodiments, the trigger functions are weighted.

For at least some embodiments, providing options of data packages to the customer, wherein the options of data packages are selected from the set of data packages sizes, is additionally based on behavior of similar types of customers (industry standards). At least some embodiments include providing options of data packages to the customer, wherein the options of data packages are selected from the set of data packages sizes, is additionally based on specific characteristics of the user. For at least some embodiments, selected options of the data package are provided to the one or more data sources through hub profiles that are generated by the network provider and provided to the one or more data source through the base station.

Figure 7:
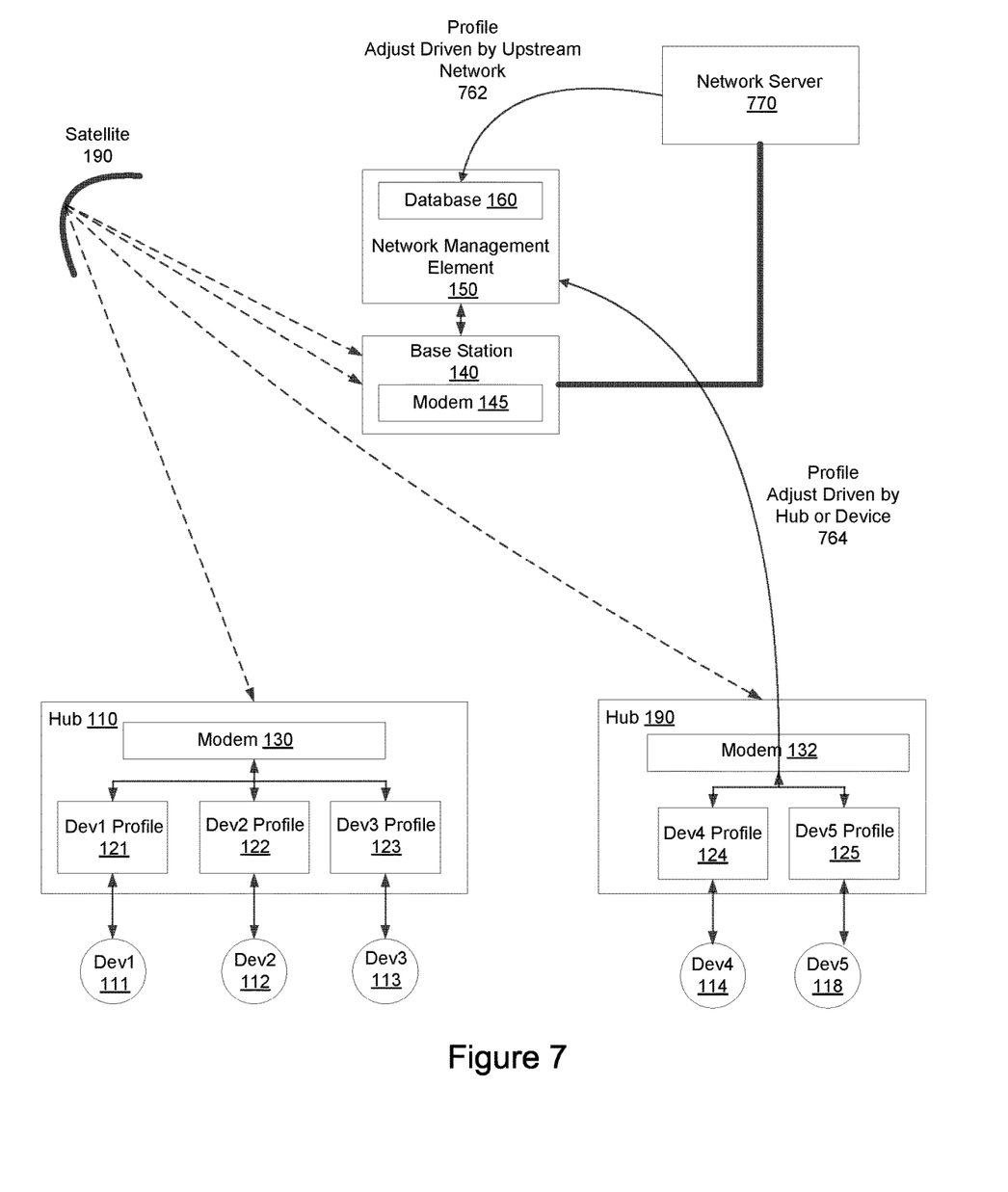
FIG. 7 shows multiple sources for providing updates or feedback of hub profiles, according to an embodiment.

FIG. 7 shows multiple sources for providing updates or feedback of hub profiles, according to an embodiment. As described, for an embodiment, the network management element manages the hub profiles 121, 122, 123, 124, 125 of the data devices 111, 112, 113, 114, 118. At least some embodiments include adjusting the hub profile. At least one embodiment includes the hub profile adjustment 764 by sourced by a downstream device, such as, one or more of the hubs 110, 190. At least one other embodiment includes the hub profile adjustment 762 being sourced by, for example, a network operation center 770 through, for example, the network server.

As stated, for at least some embodiments, the hub profiles are adaptively updated based on a top-down feedback from the network operation center 770 or the network management element 150. For an embodiment, this includes rebalancing preamble codes assigned to different data devices to smooth RACH (random access channel) profiles, which is triggered, for example, by the detection of excess (greater than a threshold amount) collisions between RACH transmission. For an embodiment, the rebalancing includes assigning to the offending devices disparate orthogonal preamble codes to mitigate the collisions. For an embodiment, this includes adjusting timing offsets (adjusting the timing offset includes adjusting the relative timing of periodic reporting) to smooth network traffic congestion and maintain network utilization for periodic data below X %, by measuring allocated versus free network resource units. For an embodiment, this includes updating hub profiles when changing an application of a data device, triggered by user/owner operator intervention, for example, via a web console. For an embodiment, this includes updating the course round trip delay timing, triggered, for example, by a new hub registration on a base station.

As stated, for at least some embodiments, the hub profiles are adaptively updated based on a bottom-up feedback from the hubs 110, 190 or the data sources 111, 112, 113, 114, 118. For an embodiment, this includes the previously described fine round-trip timing delay, constantly updated within the hub profiles based upon GPS coordinates of the hubs 110, 190. For an embodiment, this includes the hub profile of a data device being updated by a hub through a communication link to the hub. For example, a user/operator may proactively update a profile through the hub by connecting via wireless phone to the hub. This can be useful, for example, when the hub is located in a remote location that is not serviced by a cellular network, and therefore, a user/operator has no way of connecting to the network operation center 770 or the network management element 150 without the wireless satellite connection provided by the hub. The only way for the user/operator to update one or more of the hub profiles is through the bottom up feedback provided by the hub.

Figure 8:
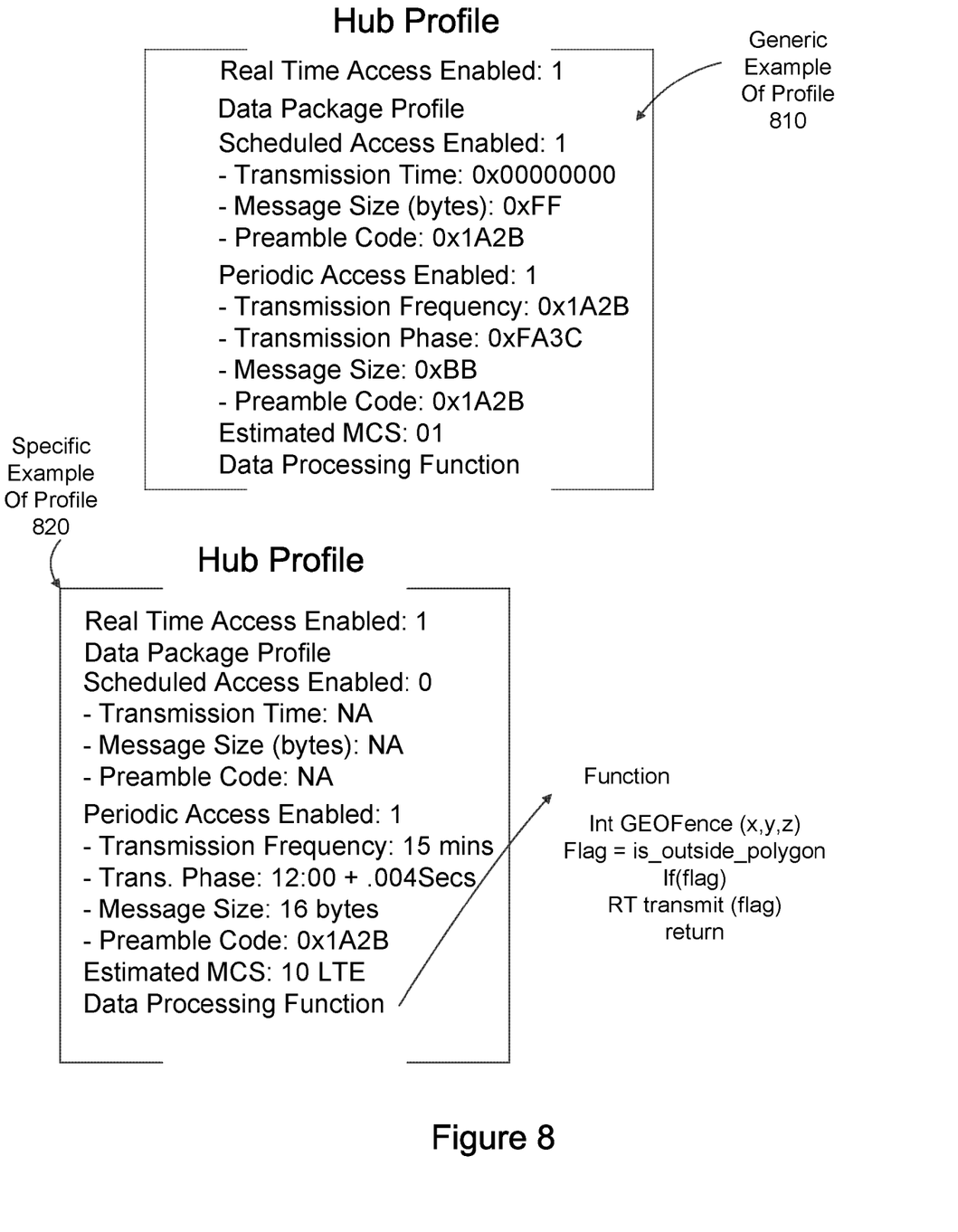
FIG. 8 shows hub profiles, according to an embodiment.

FIG. 8 shows hub profiles, according to an embodiment. The hub profiles provide coordination of the communication of the data of the data devices over the shared wireless satellite links. The communication can include one or more of real time data reporting, scheduled data reporting, and/or periodic data reporting. The hub profile for a given data device provides the hub associated with the data device the ability to control a timing of communication of the data for each of the one or more data sources from the hub to a base station through the wireless satellite link. The controlled timing provides for synchronization of the communication of the data with respect to the communication of data of other data source of both the same hub, and for one or more different hubs. For an embodiment, the hub profile additionally provides the hub with a frequency allocation for the communication of the data of the data source.

An exemplary generic hub profile 810 of FIG. 8 includes enablement of real time access or real time reporting of the data of the data device, enablement of scheduled access or scheduled reporting of the data of the data device, and enablement of periodic access or periodic reporting of the data of the data device. As previously described, for an embodiment, the data included within the reported data packages is placed within the data packages according to a template within the data package profile. Further, for an embodiment, the hub profile also includes an estimated MCS (modulation and coding scheme). Further, for an embodiment, the hub profile also includes a data processing function.

A specific example of a hub profile 820 provides for reporting of the location of a data device. This could be, for example, the reporting of data of a data device associated with a vehicle. For this embodiment, both the real time data reporting and the periodic data reporting are enabled, but the scheduled reporting is not enabled. As previously stated, for an embodiment, the reporting of the data is specified by the template within the data package profile, and reported according to the trigger function of the data package profile, which may be customer user selected. As shown, for the specific case of the hub profile 820, the periodic reporting is specified to report once every 15 minutes, beginning and 12:00 (noon). Further, the reporting data package includes a message size of 16 bytes, wherein the preamble codes and the MCS are specified. The hub profile 820 includes a specific data processing function. The exemplary function includes determining whether the data device (and therefore, the vehicle associated with the data device) is within a geographical fence. While the data device is within the geographical fence, the data device follows the periodic reporting schedule as specified by the hub profile. If the data device is detected to leave an area specified by the geographical fence, the real time reporting flag is triggered, and the hub of the data device performed real time communication with the base station that includes, for example, the location of the data device as detected outside of the geographical fence.

Figure 9:
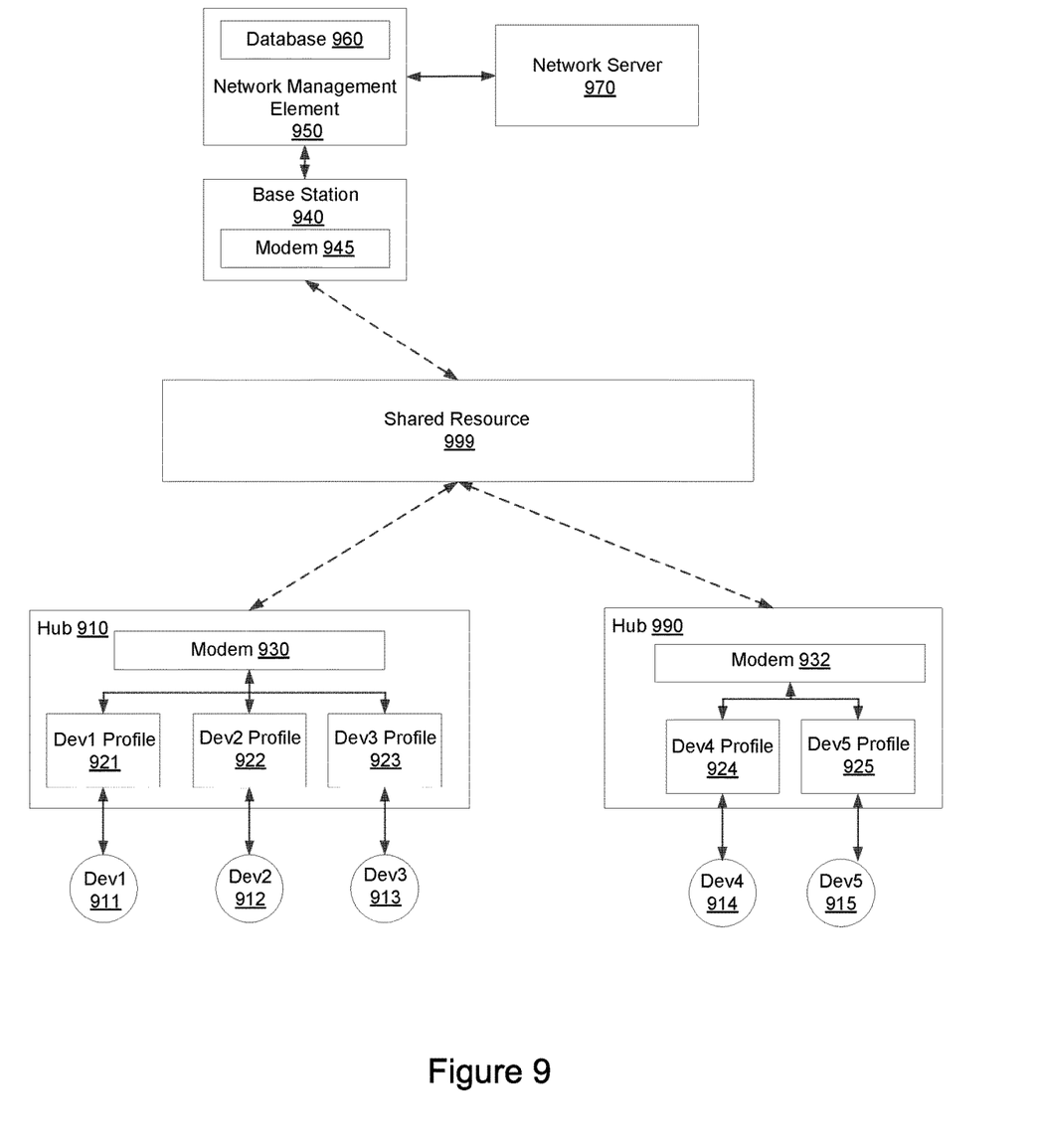
FIG. 9 shows a plurality of hubs that communicate data of data sources through a shared resource to a base station, according to an embodiment.

FIG. 9 shows a plurality of hubs that communicate data of data sources through a shared resource to a base station, according to an embodiment. As shown, the data sources 911, 912, 913, 914, 915 are connected to the hubs 910, 990. The hubs 910, 990 communicate through modems 930, 932 to a modem 945 of the base station 940 through the wireless links. For an embodiment, the wireless links are a shared resource 999 that has a limited capacity. The described embodiments include hub profiles which are utilized to provide efficient use of the shared resource 999.

For an embodiment, the base station 940 also communicates with the network server 970. As previously described, data package selections may be received by the network server 970 from a user customer. Further, trigger functions for reporting of data of the data packages may be received by the network server 970 from the customer user, which is included within the data package profile, which is include within the hub profiles.

As previously described, it is to be understood that the data sources 911, 912, 913, 914, 915 can vary in type, and can each require very different data reporting characteristics. The shared resource 999 is a limited resource, and the use of this limited resource should be judicious and efficient. In order to efficiently utilize the shared resource 999, each of the data sources 911, 912, 913, 914, 915 are provided with hub profiles 921, 922, 923, 924, 925 (including the corresponding data package profile) that coordinate the timing (and/or frequency) of reporting (communication by the hubs 910, 990 to the base station 940 through the shared resource 999) of the data provided by the data sources 911, 912, 913, 914, 915.

For an embodiment, a network management element 950 maintains a database 960 in which the hub profiles 921, 922, 923, 924, 925 can be stored and maintained. Further, the network management element 950 manages the hub profiles 921, 922, 923, 924, 925, wherein the management includes ensuring that synchronization is maintained during the data reporting by the hubs 910, 990 of the data of each of the data sources 911, 912, 913, 914, 915. That is, the data reported by each hub 910, 990 of the data of the data sources 911, 912, 913, 914, 915 maintains synchronization of the data reporting of each of the data sources 911, 912, 913, 914, 915 relative to each other. Again, the network management element 950 ensures this synchronization through management of the hub profiles 921, 922, 923, 924, 925. The synchronization between the data sources 911, 912, 913, 914, 915 distributes the timing of the reporting of the data of each of the data sources 911, 912, 913, 914, 915 to prevent the reporting of one device from interfering with the reporting of another device, and provides for efficiency in the data reporting.

For at least some embodiments, the network management element 950 resides in a central network location perhaps collocated with multiple base stations and/or co-located with a network operations center (as shown, for example, in FIG. 6). For an embodiment, the network management element 950 directly communicates with the base station 940 and initiates the transfer of hub profiles across the network via the base station 940 to the hubs 910, 990.

For at least some embodiments, hub profiles are distributed when new hubs are brought onto the network, when hubs change ownership, or when the hubs are re-provisioned. Other changes to hub profile contents outside of these situations are more likely addressed by sync packets (for an embodiment, a sync packet is a packet to update the value of a specific field inside of a hub profile, but not necessarily updating the structure of the hub profile) were only small changes to profile fields are required.

As described, the hub profiles 921, 922, 923, 924, 925 control timing of when the hubs 910, 990 communicate the data of the data sources 911, 912, 913, 914, 915 through the shared resource 999. Accordingly, the described embodiments coordinate access to the shared resource 999 to ensure optimal usage of the network resource to avoid collisions between packets, the transmission of redundant information, and to reshape undesired traffic profiles.

Although specific embodiments have been described and illustrated, the embodiments are not to be limited to the specific forms or arrangements of parts so described and illustrated. The described embodiments are to only be limited by the claims.

What is claimed:

1. A method, comprising:
providing, by a network provider, options of data packages to a customer user, wherein the options of data packages are selected from a set of data packages based on the data types the customer user is to have reported from one or more data sources used by the customer user; and
receiving, by the network provider, from the customer user, a selection of a data package from the provided options of data packages, wherein the selected data package includes one or more data types, and when data of the selected data package are to be reported through a wireless uplink between the one or more data sources to a base station.

2. The method of claim 1, further comprising:
reporting data from the data sources used by the customer user through the wireless uplink according to the selected data package.

3. The method of claim 1, further comprising:
collecting, by the network provider, statistics of reporting of data of the data packages;
adaptively updating the options of the data packages provided to the customer user based on the collected statistics.

4. The method of claim 1, wherein the options of data packages provided to the customer user are additionally selected from the set of data packages sizes to improve data traffic between the one or more data sources and the base station.

5. The method of claim 1, wherein the selected data package includes an identifier, and a template, wherein the template specifies where different data types are located within the package.

6. The method of claim 5, wherein the selected data package further includes a trigger function that specifies when data within the selected data package is reported through the wireless uplink.

7. The method of claim 6, wherein the trigger function includes one or more of periodic reporting, state change detection reporting, or scheduled reporting of the collected data.

8. The method of claim 7, wherein the trigger functions are weighted.

9. The method of claim 1, wherein providing options of data packages to the customer user includes selecting options of data packages from the set of data packages sizes additionally based on behavior of similar types of customers.

10. The method of claim 1, wherein providing options of data packages to the customer user includes selecting options of data packages from the set of data packages sizes additionally based on specific characteristics of the user.

11. The method of claim 1, wherein selected options of the data package are provided to the one or more data sources through hub profiles that are generated by the network provider and provided to the one or more data source through the base station.

12. A data source reporting system, comprising:
a plurality of data sources, the plurality of data sources connected through a wireless link to a base station;
a network server network connected to the base station, the network server operative to:
provide options of data packages to a customer user, wherein the options of data packages are selected from a set of data packages based on the data types the customer user is to have reported from one or more data sources used by the customer user; and
receive from the customer user, a selection of a data package from the provided options of data packages, wherein the selected data package includes one or more data types, and when data of the selected data package are to be reported through a wireless uplink between the one or more data sources to a base station.

13. The system of claim 12, wherein the one or more data sources are operative to:
report data from the data sources of the customer user through the wireless uplink according to the selected data package.

14. The system of claim 12, wherein the network server is further operative to:
collect statistics of reporting of data of the data packages;
adaptively update the options of the data packages provided to the customer user based on the collected statistics.

15. The system of claim 12, wherein the options of data packages provided to the customer user are additionally selected from the set of data packages sizes to improve data traffic between the one or more data sources and the base station.

16. The system of claim 12, wherein the selected data package includes an identifier, and a template, wherein the template specifies where different data types are located within the package.

17. The system of claim 16, wherein the selected data package further includes a trigger function that specifies when data within the selected data package is reported through the wireless uplink.

18. The system of claim 17, wherein the trigger function includes one or more of periodic reporting, state change detection reporting, or scheduled reporting of the collected data.

19. The system of claim 18, wherein the trigger functions are weighted.

20. The system of claim 12, wherein providing options of data packages to the customer user, wherein the options of data packages are selected from the set of data packages sizes, is additionally based on behavior of similar types of customers.

* * * * *